F. B. COREY.
SCREW FORMED FROM SHEET METAL.
APPLICATION FILED MAR. 20, 1916.

1,187,714. Patented June 20, 1916.

Witnesses,
Alex J. Paff
N. F. Loeb

Inventor,
Fred B. Corey.

UNITED STATES PATENT OFFICE.

FRED B. COREY, OF EDGEWOOD PARK, PENNSYLVANIA.

SCREW FORMED FROM SHEET METAL.

1,187,714.     Specification of Letters Patent.    Patented June 20, 1916.

Application filed March 20, 1916. Serial No. 85,307.

*To all whom it may concern:*

Be it known that I, FRED B. COREY, a citizen of the United States, residing at Edgewood Park, in the county of Allegheny and State of Pennsylvania, have invented certain new and useful Improvements in Screws Formed from Sheet Metal, of which the following is a specification.

My invention relates to screws, such as are used in various machine structures, and especially to set screws of the headless or safety type.

The objects of my invention are to provide a screw that shall be radially compressible so as to form a tight joint in the screw threads, that shall be under spring tension so as to remain tight under all conditions, and that may be manufactured at a minimum cost.

My invention consists in forming the screw from a single piece of sheet metal of proper thickness, a portion of the said sheet metal being shaped to form a driving member for operative engagement with a proper wrench or driver, another portion of the sheet metal being compressed inward to form the cupped point of the screw and an outer cylindrical portion of the sheet metal that is adapted to form the threaded portion of the screw.

Figure 1:
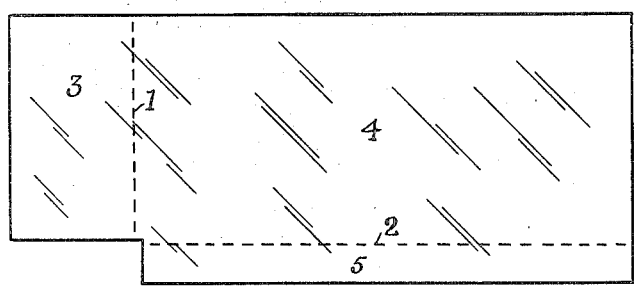
Figure 2:
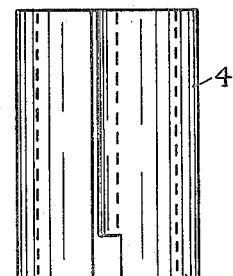
Figure 3:
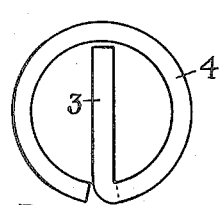
Figure 4:
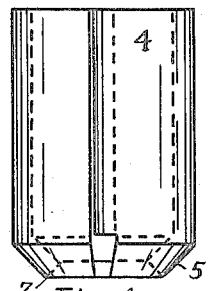
Figure 5:
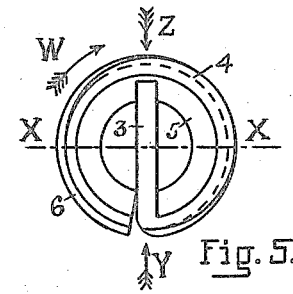
Figure 6:
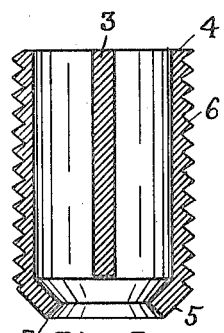
Figure 7:
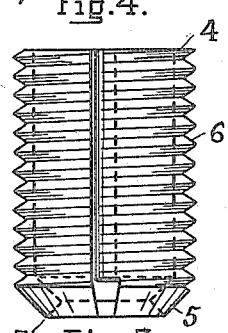
Figure 8:
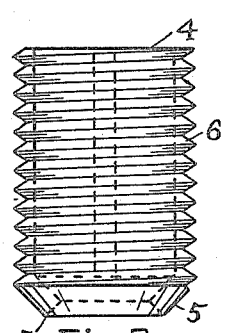
Figure 9:
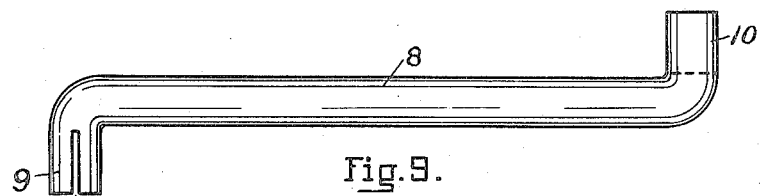
Figure 10:
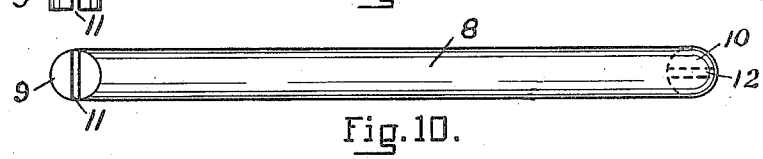

In the drawings which illustrate my invention, Figure 1 shows the outline of a flat piece of sheet metal of proper shape to be formed into a safety or headless set screw of my improved design. Fig. 2 shows a side view of the piece of sheet metal after the first forming operation has been completed. Fig. 3 shows the top view of the piece shown in Fig. 2. Fig. 4 is a side view of the same piece after the nosing or point forming operation has been completed. Fig. 5 is a top view of the part shown in Fig. 4 after the set screw has been completed by cutting a screw thread on the outer cylindrical portion. Fig. 6 is a sectional view of the set screw shown in Fig. 5, taken on a plane indicated by the line X—X in Fig. 5 and looking in the direction indicated by the arrow Y. Fig. 7 is a side view of the set screw shown in Fig. 5, looking in the direction indicated by the arrow Y. Fig. 8 is a similar side view looking in the direction indicated by the arrow Z in Fig. 5. Fig. 9 is a side view of a wrench for use with set screws of my improved design. Fig. 10 is a view of the same wrench at right angles to the view shown in Fig. 9.

Referring first to Fig. 1, the dotted line 1 shows where the piece of sheet metal is first bent in forming the interior tang portion for engagement with the wrench and the exterior cylindrical portion of the screw which is to carry the threaded surface, while the dotted line 2 shows where the metal near the lower edge is afterward bent by the nosing operation to form the hollow point of the screw. 3 is the portion of the sheet metal to the left of the dotted line 1, which portion forms the internal tang. 4 is the portion of the sheet metal to the right of the dotted line 1 and above the dotted line 2, which portion forms the outer cylindrical portion of the screw. 5 is the portion of the sheet metal below the dotted line 2, which portion is afterward bent and compressed to form the hollow point of the screw. In the other figures of the drawing, which show the sheet metal after bending, the numerals 3, 4 and 5 indicate the same portions of the sheet metal as in Fig. 1.

Referring to Figs. 2 and 3, the portion 4 of the sheet metal is bent to form a hollow cylinder, while the portion 3 remains flat and forms a wall extending across the interior of the hollow cylinder in a diametral plane. It is this portion 3 that forms the tang by which the screw is driven by the wrench or driver.

In Fig. 4, the lower portion 5 of the sheet metal has been turned inward to form a point that gives this screw all the essential features of the ordinary cut pointed set screw.

Figs. 5, 6, 7 and 8 show this improved form of screw after the screw thread 6 has been cut on the outer cylindrical surface, thus completing the screw, with exception of the final case hardening operation which is necessary to insure the proper action and durability of the screw. It will be seen that the tang portion 3 does not extend below the cylindrical portion as it would otherwise interfere with the forming of the conical point and would also obstruct the interior of the point so as to interfere with the bearing edge 7 of the said point.

In Figs. 9 and 10 is shown a suitable wrench for the manipulation of my improved set screws. This wrench is formed from a round bar of steel and consists of the handle portion 8 and the two engaging portions 9 and 10 which are bent at right angles to the handle portion 8 in order to secure the proper leverage in manipulating the set screw. Across the engaging portions 9 and 10 are cut the slots 11 and 12 respectively, these slots 11 and 12 being of the proper width to engage the tang portion 3 of the set screw. In order to permit the proper turning of a screw where the possible angular movement of the wrench is less that 180 degrees, the two slots 11 and 12 are cut in planes that are perpendicular to each other.

It will be noted that when the screw is put in place, it is turned about its axis in the clockwise direction as indicated by the arrow W in Fig. 5. If the threaded portion of the screw is somewhat oversize in diameter, the screw will be somewhat compressed in the turning movement so that it will enter the tapped hole and be held in tension against the sides of the internal threaded portion of the hole, thus insuring a tightness that will prevent accidental backing-off of the screw due to vibration and other causes. In the usual forms of safety set screws, which are provided with square or hexagonal holes in their interiors and are manipulated by wrenches having square or hexagonal ends, the pressure of the wrench tends to expand the screw. Such a screw contracts slightly when the pressure of the wrench is relieved, rendering it slightly loose in the hole. In my improved form of set screw, the screw is tighter when the pressure of the wrench, after inserting the screw, is relieved. When the screw is withdrawn, however, by turning the screw in the counterclockwise direction, opposite to that indicated by the arrow W in Fig. 5, the screw is somewhat tightened, making it necessary to exercise more force in withdrawing the screw than in inserting it. This difference in driving force, however, is not sufficient to prevent the withdrawal of the screw, on account of the compressibility of the screw.

In my preferred construction, the tang portion extends across the interior of the screw, the width of this tang portion being only slightly less than the diameter of the interior of the screw. It is obvious, however, that this tang portion may be comparatively narrow, extending into the interior of the screw only a sufficient distance to make a driving engagement with a slotted wrench. While the screw illustrated in the drawing is threaded for its entire length, it is obvious that the ratio of the length of the thread to the length of the cylindrical portion of the screw body has no bearing on this invention. While the screw illustrated is headless, it is also obvious that a screw head may be made separately and attached to the end of this screw, or a head may be formed integrally with this screw, without departing from the spirit or scope of this invention. I, therefore, do not desire to limit myself to the exact construction and arrangement of parts here shown, but aim in the appended claims to cover all the modifications which are within the scope of my invention.

What I claim as new and desire to secure by Letters Patent of the United States is—

1. A screw formed from sheet metal, comprising an internal tang or driving portion and an external threaded cylindrical portion.

2. A screw formed from sheet metal, comprising an internal tang or driving portion, an external threaded cylindrical portion and a conical end portion.

3. A screw formed from sheet metal, comprising an internal tang or driving portion and an external threaded cylindrical portion, the length of the said tang portion being less than the length of the screw.

4. A screw formed from sheet metal, comprising an internal tang or driving portion, an external threaded cylindrical portion and a conical end portion, the said conical portion extending beyond the limits of the said tang portion.

5. A screw formed from sheet metal, comprising a radially compressible cylindrical threaded portion and a tang or driving portion formed integrally with the said cylindrical portion.

6. A screw formed from sheet metal, comprising a radially compressible cylindrical threaded portion, a tang or driving portion and a conical end portion.

In witness whereof I have set my hand this 2d day of February, 1916.

FRED B. COREY.

Witnesses:
SIMON F. LOEB,
D. ATWELL.